(12) United States Patent
Fontaine

(10) Patent No.: US 8,225,935 B2
(45) Date of Patent: Jul. 24, 2012

(54) METHOD FOR RECOVERING CLAY IN PARTICULAR DERIVED FROM FOUNDRY SANDS AND INDUSTRIAL SOIL TO BE CLEANED UP

(76) Inventor: Albert Fontaine, Comblain-au-Pont (BE)

( * ) Notice: Subject to any disclaimer, the term of this patent is extended or adjusted under 35 U.S.C. 154(b) by 942 days.

(21) Appl. No.: 11/917,567

(22) PCT Filed: Jun. 13, 2006

(86) PCT No.: PCT/EP2006/063134
§ 371 (c)(1),
(2), (4) Date: Mar. 10, 2008

(87) PCT Pub. No.: WO2006/134099
PCT Pub. Date: Dec. 21, 2006

(65) Prior Publication Data
US 2008/0202986 A1    Aug. 28, 2008

(30) Foreign Application Priority Data
Jun. 14, 2005   (BE) .................................. 2005/0300

(51) Int. Cl.
*B03B 7/00*   (2006.01)
(52) U.S. Cl. ............................................. 209/17; 209/5
(58) Field of Classification Search .................. 209/172, 209/172.5, 173, 5, 17
See application file for complete search history.

(56) References Cited

U.S. PATENT DOCUMENTS 5,073,406 A * 12/1991 Takahashi et al. ............ 427/131
5,316,664 A * 5/1994 Gregoli et al. ................ 208/390
5,540,270 A * 7/1996 Grote et al. ....................... 164/5

FOREIGN PATENT DOCUMENTS

EP            0 185 831 A1    7/1986

OTHER PUBLICATIONS

Ren C. Luo et al: "The Development of a Direct Metallic Rapid Prototyping System", Proceedings of the 2004 IEEE International Conference on Robotics & Automation, New Orleans, Apr. 2004, p. 33, col. 2, paragraph II.

* cited by examiner

*Primary Examiner* — Stefanos Karmis
*Assistant Examiner* — Kalyanvenkateshware Kumar
(74) *Attorney, Agent, or Firm* — Fitch, Even, Tabin & Flannery, LLP

(57) ABSTRACT

A method and a device for recovering clay derived from a contaminated raw material containing clay. The method includes eliminating from the contaminated material contaminating materials not bound to the clay, mixing the contaminated raw material, free of unbound contaminating materials, with water, separating from the mixture clay suspended in water and residues of raw material depleted in clay, and separately recovering clay and water.

12 Claims, 2 Drawing Sheets

METHOD FOR RECOVERING CLAY IN PARTICULAR DERIVED FROM FOUNDRY SANDS AND INDUSTRIAL SOIL TO BE CLEANED UP

The present invention relates to a method of recovering clay coming from a contaminated raw material containing clay.

The present invention concerns more particularly the field of the reprocessing of foundry waste and the field of the cleaning of contaminated soil and earth.

In the case of founding, these contaminated raw materials are non-recyclable foundry sand waste, in particular casting, coring and moulding sand rejects that contain sand bound to clay, and which can be reprocessed by the method according to the invention.

Currently, these founding industries have large quantities of sand waste, coming principally from the process of casting with sand bound to clay.

These contaminated raw materials come from various casting, knocking-out and coring stations, exhaust ventilation filters, shot blasting installations and residues on the ground.

These contaminated raw materials are generally dumped, which represents a significant cost for the business.

With regard to the contaminated soil and earth, they generally come from former decommissioned industrial sites. In order to be able to sell these sites, the owner must absolutely clean it up, without which it is not possible to sell it.

With the Antipollution Rules drawn up by the international community, which, according to current trends, are becoming more and more strict, dumping contaminated materials is more and more becoming a cost that is difficult to bear for companies. These rules are aimed at obliging manufacturers in all fields to reduce emissions of pollutants of any kind and consequently waste is becoming more and more expensive to dump in order to push manufacturers to find solutions to the problem of emission and dumping of pollutants and various contaminants.

There is therefore a demand, both in founding and in the cleaning up of contaminated ground and earth, for a method for reducing the quantity of waste to be dumped while allowing recovery of the raw material. This is because, in general, contaminated raw materials represent an enormous volume of material that gives rise to a very high dumping cost.

It is the presence of residues such as phenol, isocyanates, esters, oxides, hydrocarbons, heavy metals and other polluting substances that determines the class of dumping, and the more contaminating the product to be dumped, the higher the class of waste and the higher the cost of this storage.

Consequently, storage in dumps, because of the problems of the choice of sites, environment and ecology, is becoming more and more tricky and difficult. As a result high budgets for transporting these materials and paying dumping fees must be provided for.

Currently there exist various solutions for processing waste, but these solutions are not ecological and in general terms are limited by other problems.

For example, there exist installations for the heat treatment of waste, which, in the majority of cases, incinerate it, but the combustion of the waste gives rise to a significant discharge of various polluting substances, which requires expensive treatment of the combustion discharge.

Other installations use the washing of waste for removing a contaminating part of the waste, for example by percolation, simple washing or other similar techniques, but these techniques are all based on an entrainment of contaminants or solubilisation of certain substances in water by washing the contaminated material.

Biological treatment is another example of the treatment of waste, but it is limited by the nature and quantity of pollutant in the earth or soil.

In addition, in order to be able to adapt to the new rules published by the international community, such a method must be ecological, that is to say it must not shift the problem by producing other pollutants, for example by a use of various chemical products or by causing polluting emissions, for example coming from the combustion of waste.

By way of example, a method is known for recovering raw material from foundry sand (see U.S. Pat. No. 5,540,270). This method comprises an addition of water to the raw granular material, wet attrition thereof, that is to say progressive wear caused by friction, separation according to size into two flows of particles in suspension, and an addition of a flocculation agent to the flow of particles having the smallest particle size.

As mentioned in this document, the quantity of water is between 50% and 20% in order to ensure the application of friction in the most intense manner possible. The violent agitation in the attrition cells eliminates the fine particles situated at the surface of the sand (in particular the clay). These therefore constitute the flow of particles having the smallest particle size while the sand constitutes the second flow.

The sole purpose of such a process is to recover the sand, the clay situated in the flow of particles having the smallest particle size is completely destroyed by the addition of the flocculation agent. In addition, this method uses pH adjustment agents and flocculation agents as well as various additives, which merely shift the problem of pollutants to be treated.

The aim of the present method is to mitigate the drawbacks of the current solutions for treating contaminated raw material by proposing an ecological and reliable reprocessing method that is inexpensive to implement and use.

To this end, the method comprises:
  elimination from the contaminated raw material of the contaminating materials not bound to the clay,
  mixing of the contaminated raw material, with the non-bound contaminating materials removed, with water in a ratio by weight of raw material to water ranging from 1/1 to 1/8 in order to obtain a mixture of water, residues of raw material with a low clay content and clay,
  separation from this mixture of a suspension of clay in water on the one hand and residues of raw material with a low clay content on the other hand,
  from the said suspension, a separate recovery of the clay and water.

Through these steps, the method makes it possible to recover separately the constituents of the contaminated raw material, without chemical treatment, and without introducing additional pollutants. The method according to the invention is based, unlike the prior art, on the separation of an aqueous suspension rather than on a washing of clay. In addition, in this way, if some waste resulting from the method according to the invention still requires dumping because it contains pollutants that cannot be recycled in subsequent steps, the quantity that will have to be dumped will be much less since a major part of the raw material is recovered and this will reduce the dumping costs and the costs generated by the purchase of the raw material.

For example, in the case of founding, the contaminated raw material is foundry sand bound to clay that comes from foundry moulds and the residues of raw material issuing from the said separation consist of sand substantially free from clay.

In this case, the fact that the contaminated raw material is mixed with a very large quantity of water allows the formation of a suspension of clay in water. During subsequent separation, provision is then made for recovering this suspension of clay finely dispersed in water and separately a solid phase containing the sand. This is made possible by the well-known difference in granulometric size that exists between clay and sand.

In a subsequent step, the sand containing substantially no clay is then dried, treated hot, cooled, de-dusted and sieved with a view to recycling in mould manufacture. The recycling of the sand gives the foundry a substantial saving. This is because, through such recycling, the sand, even if it still contains a few metals after the treatment by the method according to the invention, this is not a problem for its reuse in the manufacture of moulds.

Advantageously, the mixing is an abrasive mixing that lasts for between 15 and 30 minutes. The abrasive mixing is a key step in the method according to the invention in the case of the treatment of foundry waste. This is because, in founding, the contaminated raw material consists practically solely of clay, sand, carbon, various binders and a few residual metals resulting from the use of the moulds. The major difficulty is therefore separating the sand from the clay, since they are bound together by various binders such as mineral and organic binders such as phenolic or furan resin, esters, polyurethanes, alkyds and other known binders. As mentioned above, provision is made according to the invention not to add chemical substances, and consequently to provide a method allowing the separation of clay and sand without the use of chemical agents.

Surprisingly, through the development of this abrasive mixing, the constituents of the contaminated raw material and in particular the particles of sand exert a rubbing action on one another and this has the effect of detaching the clay from the sand by abrasion, the binders being recovered in the water. It is important to allow this optimum abrasion to take place for sufficiently long to ensure detachment of the clay from the sand. The period of time necessary is from 15 to 30 minutes. Consequently, during the subsequent separation step, it is possible to recover the sand as a solid phase and the clay dispersed in water in the form of a suspension, by virtue of the large quantity of water used, the water also containing the various binders. Any carbon present is also finely dispersed in the water.

As mentioned previously, the water in which the clay and carbon, and possibly other fine particles, are dispersed is then in its turn subjected to a separation, preferably by settling. The settling makes it possible to recover, in the bottom of the settling tank, the clay, any fine particles and carbon, the water will be recovered in the top of the tank and will be reintroduced into the process at the mixing. The sedimented part recovered in the bottom of the settling tank can then be pressed, dried or undergo other equivalent treatments to obtain a mixture of clay, carbon and any other fine particles, able to be reused in the manufacture of moulds.

In certain cases, this recovered sedimented part may prove to be too polluted and will consequently be dumped, but the quantity dumped in this case will be much less than if all the contaminated raw material had been thus consigned. This is because this sedimented part represents between 1% and 25% by weight of the contaminated raw material.

In addition, it is also possible to provide a prior settling of the suspension of clay in water for a period less than a predetermined time limit corresponding to the time necessary for the settling of pure clay, which will make it possible to recover separately purified clay and clay possibly weighted by various contaminants.

In the case of industrial soil to be cleaned up, the contaminated raw material is a soil coming from an industrial site that contains contaminants.

Advantageously, provision is made according to the invention to effect elimination, from the contaminated raw material, of the contaminating materials not bound to clay, before mixing. This elimination separates and eliminates the contaminants found in the industrial soil such as metallic parts, pieces of wood, paper, large pebbles, etc.

In certain embodiments, it may be advantageous to effect an elimination comprising several screenings, a first screening that eliminates everything that has a size greater than 150 mm and then a second screening that lets pass everything that is less than 25 mm. This double screening can possibly be carried out by a single screening step by means of a two-stage vibrating belt.

In certain embodiments, it may be advantageous to cause the contaminated earth to pass over conveyors enabling workers to sort the waste.

Before carrying out the mixing, it may be advantageous to carry out an additional sorting with a vibrating sieve comprising a 6 mm opening.

A first recovered part will have a size of between 6 mm and 25 mm and will be transferred onto a conveyor provided with an overband in order to eliminate all the ferrous and magnetic materials. If necessary, in the case of major pollution by waste, a manual sorting will also be carried out by the workers.

A second recovered part will have particles with a size of between 0 and 6 mm, this part will be mixed with a large quantity of water.

The mixing separates the hydrocarbons, the heavy metals and other pollutants of the soil. After mixing, the mixed product is recovered and the separation step is performed.

In a particular embodiment, the mixing lasts between two and five minutes and preferably between two and three minutes. This interval of time makes it possible to put the clay in suspension in the water.

Advantageously, the separation of the suspension of clay in water on the one hand and the residues of raw material containing little clay on the other hand is a sieving calibrated at 1 mm.

In this embodiment, the separation will for example be a sieving for separating firstly the fraction less than 1 mm, which will consist of clay finely dispersed in water, and secondly for example the residues which will have a size greater than 1 mm.

In the known methods that are based on a washing of contaminated material, as mentioned above, only water containing certain contaminants, either solubilised or entrained, is obtained, but in no circumstances will it be possible to recover separately the clay from the sand since in this case they will both be in the solid phase.

Advantageously, the method comprises an additional separation that is carried out before the said separate recovery of the clay and water, the said additional separation making it possible to isolate small-sized stones, heavy metals and other contaminants present having a compactness and density greater than those of clay.

This is because, through this prior separation, which is preferably a settling based on the differential sedimentation of the components, it is possible to recover in the bottom of the tank the waste such as small-sized stones, heavy metals and other contaminants present whose compactness and density are greater than those of clay.

The clay, if this settling does not last more than 6-7 hours, will not have the time to sediment. Consequently the top part of the settling tank is a fraction containing essentially clay and water. This fraction will be subjected to the settling provided for previously, which supplies a clay fraction and a water fraction.

Advantageously, the water will be reintroduced into the process at the mixing.

In a preferential embodiment, the recovered clay is then dried before being reintroduced on the said site. This is because, in the majority of applications, the clay recovered in the bottom of the settling tank is sufficiently clean to be reintegrated on the site, for example after drying, which may be conventional hot-air drying, pressing, etc.

The present invention also relates to a device for implementing the method, for example the method applied in a foundry, comprising:

means of eliminating contaminating materials not bound to the clay, in which the contaminated raw material has the non-bound contaminating materials removed, a mixer, supplied with the said contaminated raw material issuing from the means of eliminating non-bound contaminating materials and water, separation means, connected to the mixer and separating a suspension of clay in water and a solid phase containing the said residues of raw material containing little clay, and suspension treatment means for receiving the said suspension of clay in water and recovering separately the clay from the water.

Advantageously, the mixer is of the pug mill type and comprises a vessel and at least two rotary transverse kneading arms.

In addition, the kneading arms are spaced apart from each other by a distance of between 1 and 10 mm, preferably between 1 and 7 mm, according to the particle size of the contaminated raw material.

As mentioned previously, the mixing in a foundry application is a crucial step. Consequently it has been necessary to find means for performing an abrasive mixing, allowing solely the separation of the sand and clay, without the mixed particles being ground, the whole with a mixture consisting for the major part of water (1 to 8 times by weight of water with respect to the contaminated raw material). Preferentially, the mixture will consist of a little more water by weight than contaminated raw material, for example 51% water, 55% water, 60% water, 65% water, 70% water up to 80% water according to the type of clay to be recovered.

For this purpose, provision is made according to the invention to use a mixer of the dough mixer type comprising a mixing vessel and at least two rotary transverse arms. This is particularly surprising, because this type of mixer would previously have been proscribed. This is because it was logical for conventional mixers of the thick sludge mixer type to be not advised since the product to be mixed is relatively liquid.

The transverse arms trap, because of the distance that separates them, a quantity of material to be mixed and the particles are solely rubbed against one another, without being ground, and the mixture obtained is sufficiently homogeneous for the use of the mixed product in the subsequent steps.

Other embodiments of the device and method according to the invention are indicated in the accompanying claims.

Other characteristics, details and advantages of the invention will emerge from the description given below non-limitatively and with reference to the accompanying drawings.

In the figures, identical or similar elements bear the same reference numbers.

Figure 1:
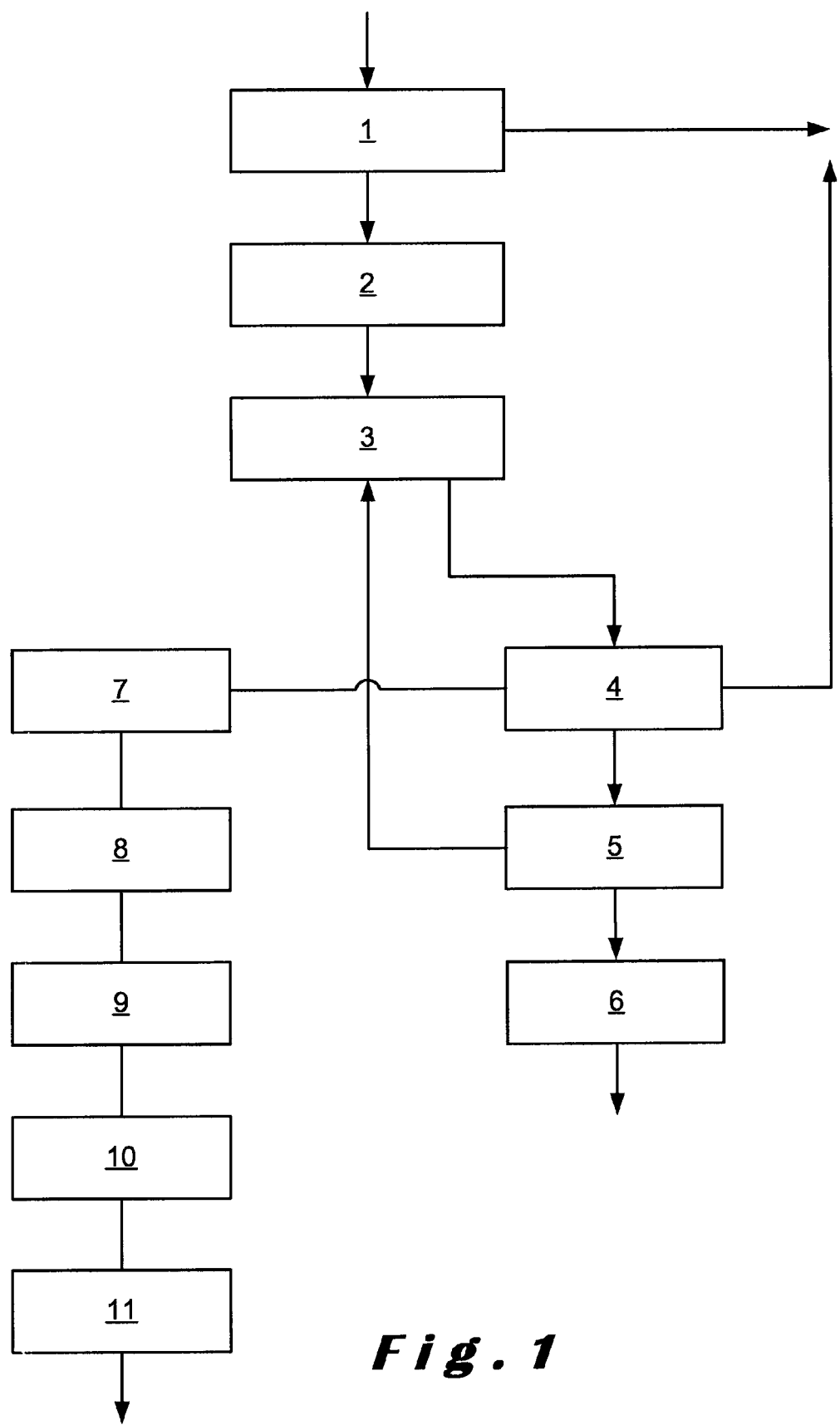
FIG. 1 is a schematic view of the device according to the invention for an application in the treatment of foundry sands.

As can be seen in FIG. 1, the foundry sand bound to the clay and containing various contaminants is brought into means 1 of eliminating contaminants not bound to the clay. These elimination means 1 allow any material to pass whose particle size is less than a predetermined limit and can be chosen from a screen, a sieve, a sorter, a conveyor or any similar type of appliance that makes it possible to eliminate contaminants not bound to the contaminated raw material, or a combination of these.

The foundry sand bound to the clay also containing waste whose size is less than the predetermined limit is stored in a distribution or storage hopper 2 that is connected to the mixer 3. The foundry sand bound to the clay is fed from the distribution hopper 2 into the mixer 3, which also comprises a water inlet.

The mixer 3 comprises, in the particular embodiment illustrated in FIG. 1, relating to a use in a foundry, two rotary transverse kneading arms, preferably horizontal. The water is fed into the mixer 3 at a ratio by weight between raw material and water of 1 to 1/8.

In a foundry, the contaminated raw material consists practically solely of clay, sand, carbon, various binders and a few residual metals resulting from the use of the moulds. The major difficulty is therefore to separate the sand from the clay, since they are bound together by various binders such as mineral and organic binders such as phenolic or furan resin, esters, polyurethanes, alkyds and other known binders.

The transverse arms are spaced apart by a distance lying in the range of 1 to 10 mm, preferably from 1 to 7 mm from each other and also from the bottom of the mixing vessel. This small distance between the kneading arms makes it possible to trap the material and means that the particles of sand exert on one another a rubbing action that will have the result of detaching the clay from the sand by abrasion. It is important to allow this optimum abrasion to take place for sufficiently long to ensure detachment of the clay from the sand. The period of time necessary is from 15 to 30 minutes.

A mixture of water, clay, sand and various contaminants is therefore recovered at the discharge from the mixer 3.

The device according to the invention also comprises separation means 4 connected to the mixer 3. The separation means 4 are for example a filter or a sieve. The separation means 4 are fed with the aforementioned mixture.

In the case of a vibrating sieve or a filter, this will be chosen so that the suspension of clay in water can pass through since it has a very small particle size. In this suspension of clay and water, fine particles, carbon and binders will also possibly be found. The mixture of sand and waste will for example be separated in another filter that will allow the passage of sand and will retain the waste.

The sand will consequently be able to undergo another treatment with a view to its recovery, the waste is also recovered for subsequent treatment, or even dumping if necessary, and the suspension of clay in water will be treated subsequently.

It is clear to a person skilled in the art that various separation techniques can be used for this purpose, it is possible for example to imagine that the separation means 4 are a double-stage filter, a vibrating sieve also of the double-stage type, a series of various separation means 4 used one after the other.

Advantageously, provision is made for the mixer 3 to comprise integrated separation means 4, such as for example outlets, screened or not, which for example enable the clay dispersed in the water to leave at a first point, for the sand in the water to leave at a second point and the large waste at a third point. It could also happen that only the suspension of clay in water can emerge continuously from the mixer 3 and for the mixture of sand and waste to be sorted and separated subsequently.

The sand is therefore recovered at the discharge from the separation means 4.

In a particular embodiment, the sand will be dried by drying means 7, for example a drying oven 7 at a temperature of between 85° and 200° C. Next, the sand will be cooled by cooling means 9, for example a conventional heat exchanger, de-dusted by de-dusting means 10, for example by means of a blower, and then sieved by sieving or screening means 11 in order to obtain a granulometric distribution in accordance with the requirements of the user.

At this stage, the sand has sufficient characteristics to be recovered for the manufacture of moulds.

In a particular application in founding, the invention also has as an object the recovery of quartz from the sand in order to be reused in a moulding sand bound to clay.

As stated previously, according to the type of founding and the type of core used in the founding, there may be a mixing between sand bound to clay and cores bound with phenolic resin, furan resin, polyurethane, alkyds, esters, silicates, etc.

There may therefore be some of these residues in the sand. After passing through the dryer 7, it may be necessary to perform a heat treatment on the sand at between 585° and 615° C. in an oven 8. This oven completely cleans the sand of the residues of coke, resin and various binders.

On emerging from the heat treatment oven 8, the sand is cooled, de-dusted and placed either in silos or deposited on the ground.

The present invention also applies to olivine, magnolite, chromite or zircon sand systems, or with other known component.

The suspension of clay in water, possibly containing other fine particles, is then in its turn subjected to a recovery of clay, preferably by settling, in clay recovery means 5, for example in at least one settling tank 5. The settling recovers, in the bottom of the settling tank 5, the clay, any fine particles and the carbon, the water will be recovered in the top of the tank and will be reintroduced into the mixer 3.

The sedimented part recovered in the bottom of the settling tank 5 containing mainly clay can then be pressed or dried or undergo other equivalent treatments in appliances such as a press, a dryer or the like, shown at 6 in FIG. 1. The clay recovered at this point, possibly containing fine particles or carbon, is sufficiently clean to be reusable in the manufacture of moulds.

Figure 2:
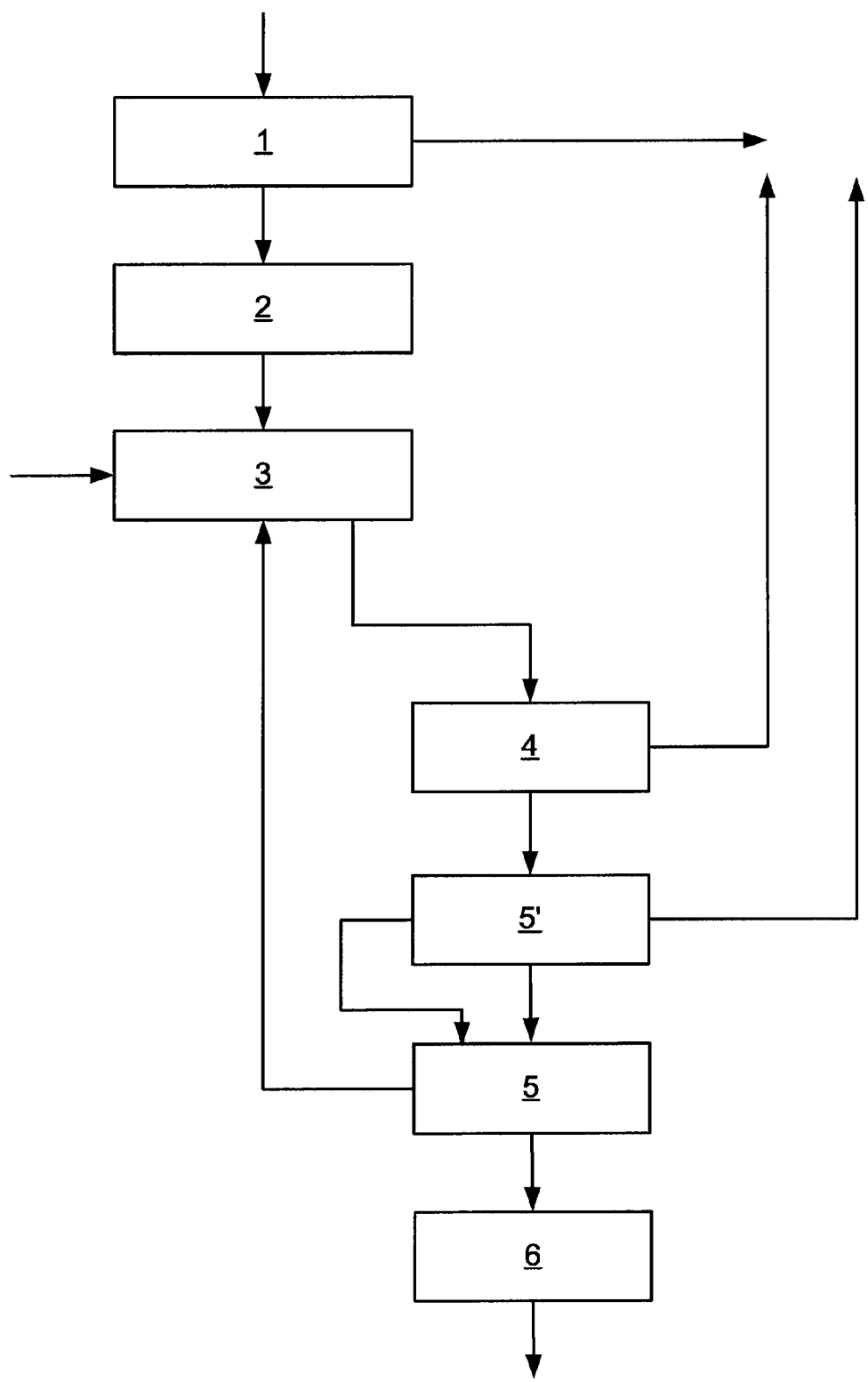
FIG. 2 is a schematic view of the device according to the invention for an application in the treatment of soils or earth to be cleaned up coming from industrial sites.

In FIG. 2, the industrial soils or earths to be treated are also fed into separation means 4, allowing sorting of various contaminants.

As before, these separation means 4 may be a series of several screening, sieving of sorting means, such as a conveyor belt allowing manual sorting, a double-stage vibrating sieve, etc.

For example, the earth is removed by a bulldozer and is brought onto a two-stage vibrating sorting sieve. The top vibrating sieve retains everything greater than 150 mm and the bottom allows anything that is less than 25 mm to pass.

In certain cases, large stones are removed and will advantageously be washed and the attached mud recovered for treatment thereof in the method according to the invention.

Consequently there is also provided in certain cases a system for pressure spraying with water and recovery of the water and earth.

In a particular embodiment, after this first sorting, it may be necessary to carry out an additional sorting with a vibrating sieve comprising a 6 mm opening, and therefore the fraction leaving the separation means 1 will preferably have a size of less than 6 mm and will be stored in a distribution or storage hopper 2 before being brought to the mixer 3.

Provision is also made for the part between 0 and 6 mm that leaves the separation means 1 to pass through a magnetic separation overband, the frequency of which will be adapted to the extraction of ferrous and magnetic metals, and then in a second installation allowing the separation of the non-ferrous metals by eddy current before being stored in the distribution hopper 2 and being brought to the mixer 3.

The earth or soils are for example sent to the mixer 3 by means of belt conveyors, pneumatic conveyors or weighing hoppers according to the possibilities of use.

The mixer 3 is designed so as to mix the earth and soils with water in order to homogenise the mixture in order to separate the hydrocarbons, the heavy metals and other pollutants and can in this case be any known type of mixer.

Advantageously, the mixing lasts for between 1 and 5 minutes, and preferably between 2 and 3 minutes.

The mixing is carried out with proportions of water with respect to the product of 1 to 8 times, which means that, for 1000 kg of earth and soils, and according to the quantity of clay that they contain, from 1000 to 8000 litres of water will be used.

The mixer 3 carries out the cleaning of all the grains of silica as well as of the earth in order to obtain a complete dilution of the fine parts in water. The content of the mixer is, in the embodiment illustrated, sent to separation means 4. As mentioned previously, it also conceivable for the mixer 3 to comprise various outlets allowing the discharge of a suspension of clay in water, and waste moreover, or several outlets enabling various granulometric fractions to be brought for subsequent treatment in another installation. Preferably either the separation means 4 or the mixer 3 comprises an outlet calibrated to 1 mm that enables the suspension of clay in water to be discharged.

The fraction with a size of between 1 and 6 mm will be cleaned normally, that is to say for example the fraction will be sieved by means of a trommel, the speed of which is calculated so as to eliminate the maximum amount of water and keep a product with a low water content.

The fraction whose particles have a size less than 1 mm, which therefore principally comprises the suspension of clay in water, is then sent to the means of processing the suspension of clay in water, for example in a settling tank.

In the treatment of industrial earth, it is advantageous for the device according to the invention to comprise at least two settling tanks 5 and 5'. In the first settling tank 5', the suspension of clay in water will be left to sediment for a short interval of time, for example between 6 and 7 hours. In this way the heavy particles, the clay containing contaminants, for example heavy metals or the like, will sediment more quickly and the clean clay will not have sufficient time to be at the bottom of the settling tank 5'. Next, this supernatant part will be transferred to a second settling tank 5 so that the clay can be recovered.

The recovered clay is then dried or pressed at 6 and the water recovered from the settling tanks is introduced into the mixer. The water, which may contain hydrocarbons and other pollutants which were in the industrial earth to be treated, can advantageously be treated by a filtration system in order to have these pollutants removed.

It may also be advantageous for the device according to the invention to comprise a series of settling tanks 5 so that the system can work continuously.

Consequently, the cleaned and de-polluted earth will be put back in place on the site to be treated.

EXAMPLES

Example 1

A foundry sand bound to clay which contained 8.5% clay was treated by the device according to the invention, this had a loss due to burning of 1.4% and a granulometry of 63 AFS.

After washing and mixing, we obtained a sand that contained no more than 0.7% fines, 0.2% loss due to burning, and a granulometry of 66 AFS.

All the various waste represents from 15% to 25% of the starting quantity of foundry sand bound to clay. The percentage of clay recovered varied between 3% and 15% of the foundry sand waste.

Example 2

For the earth and soils, tests on products that contain hydrocarbons and heavy metals were carried out.

The hydrocarbon and heavy metal content was reduced in order to obtain a result in established norms and the percentage of earth or soil recovered varies between 88% and 95%, that is to say 5% to 12% of the pollutants were eliminated.

Naturally the present invention is in no way limited to the embodiments described above and many modifications can be made thereto without departing from the scope of the accompanying claims.

The invention claimed is:

1. Method of recovering clay coming from a contaminated raw material containing clay, comprising steps of:
    removing contaminating materials not bound to the clay from the contaminated raw material,
    mixing the contaminated raw material, with the non-bound contaminating materials removed, with water to provide an aqueous mixture comprising ranging from 51% to 80% water in order to obtain a mixture of water, residues of raw material with a low clay content and clay,
    separating from the mixture a suspension of clay in water on the one hand and residues of raw material with a low clay content on the other hand, and
    separately recovering from the suspension, the clay and the water, wherein said method is carried out without chemical treatment and without introduction of any chemical substances.

2. Method according to claim 1, in which the contaminated raw material is foundry sand bound to clay that comes from foundry moulds and the residues of raw material issuing from the said separation consist of sand containing substantially no clay.

3. Method according to claim 2, in which the said sand free from clay is then dried, treated hot, cooled, de-dusted and sieved with a view to recycling in the manufacture of the aforementioned moulds.

4. Method according to claim 1, in which the mixing is an abrasive mixing.

5. Method according to claim 1, in which the mixing lasts for between 15 and 30 minutes.

6. Method according to claim 1, in which the recovered clay is (re)introduced into a manufacture of moulds.

7. Method according to claim 1, in which the contaminated raw material is an earth coming from an industrial site that contains contaminants.

8. Method according to claim 1, in which the separation of the clay in water on the one hand and the residues of raw material containing little clay on the other hand is a sieving calibrated at 1 mm.

9. Method according to claim 1, in which an additional separation is carried out before the separate recovery of the clay and water, the additional separation making it possible to isolate small-sized stones, heavy metals and other contaminants present having a compactness and density greater than those of clay.

10. Method according to claim 9, in which the recovered clay is then dried before being reintroduced onto an industrial site.

11. Method according to claim 1, in which the mixing lasts for between 2 and 5 minutes.

12. The method according to claim 11, in which the mixing lasts from 2 to 3 minutes.

* * * * *